United States Patent Office 2,793,159
Patented May 21, 1957

2,793,159

STABLE HYDROCORTISONE SOLUTION

Richard H. Johnson, Kalamazoo Township, Kalamazoo County, Mich., assignor to The Upjohn Company, Kalamazoo, Mich., a corporation of Michigan No Drawing. Application March 9, 1955,
Serial No. 493,285

2 Claims. (Cl. 167—77)

This invention relates to an intravenous hydrocortisone preparation and more particularly, relates to a stable aqueous ethanol solution of hydrocortisone which can be used intravenously.

Hydrocortisone is a well known therapeutic agent which is suitable for a large variety of diseases. Hydrocortisone is a white crystalline powder slightly soluble in water, having the empirical formula $C_{21}H_{30}O_5$ and a molecular weight of 362.4. Discoveries that hydrocortisone is the predominating corticoid in adrenal gland perfusates, adrenal venous blood and peripheral blood have led to the view that it is the principal hormone secreted by the adrenal cortex. Comparative studies in experimental animals and in man (i. e., the eosinophil test, the liver-glycogen deposition test, and muscle-work test) have demonstrated hydrocortisone to possess physiologic properties qualitatively similar to those of cortisone but approximately twice as potent.

Prior to the present invention hydrocortisone has been available in various dosage forms, which although satisfactory for most therapeutic applications of the hormone were not altogether satisfactory for the treatment of acute adrenal cortical insufficiency, such as would be necessary in situations of extreme stress when the patient's requirement for adrenal cortical steroid may be in excess of that which his own gland is capable of secreting. Prior to the present invention no stable preparation of hydrocortisone suitable for this purpose was available.

It is therefore an object of the present invention to provide a stable solution of hydrocortisone suitable for intravenous use to combat acute adrenal cortical insufficiency. Other objects will be apparent to one skilled in the art to which this invention pertains.

The foregoing and additional objects have been accomplished by the provision of a stable aqueous ethanol solution of hydrocortisone which can be used intravenously. The preparation comprises less than about eight milligrams of hydrocortisone per cubic centimeter of an aqueous vehicle containing from about fifty to about seventy percent ethanol. (All percentages are by volume unless otherwise specified.) In a preferred embodiment of the present invention the composition comprises about five milligrams of hydrocortisone per cubic centimeter of an aqueous vehicle containing about fifty percent ethanol.

The composition of the present invention can be prepared by dissolving the hydrocortisone free alcohol in ethanol and adding water. It is preferably filled into ampules for sale and distribution. The contents of the ampules are diluted with any one of a variety of infusion solutions prior to injection. Because of the high ethanol content the solution must be diluted before injecting.

The concentrations of hydrocortisone and ethanol are critical to the present invention. If more than eight milligrams of hydrocortisone per cubic centimeter of aqueous vehicle are used, the preparation proves to be physically unstable, that is the hydrocortisone will precipitate out. Similarly, if less than about fifty percent alcohol is used in the aqueous vehicle, the product will be unstable. On the other end of the scale, the minimum amount of hydrocortisone is limited by the therapeutic dose desired. The maximum amount of ethanol is limited by toxicity of ethanol for intravenous use (e. g., the harmful effect of ethanol in conditions of shock for which the administration of intravenous hydrocortisone would be otherwise desirable) and the increased fire hazard occasioned by sterile processing (e. g., would occur when ampules containing the composition are flame sealed during manufacture) as well as lessened physical stability as indicated in Table I. All things taken into consideration, the preferred concentration is about five milligrams of hydrocortisone per cubic centimeter of aqueous vehicle containing about fifty percent ethanol.

The physical and chemical stability of the composition of the present invention is summarized in Tables I and II. Table I shows the effect of various concentrations of hydrocortisone and ethanol. The criticality of the concentrations previously discussed is clearly indicated by the table. Table II gives data showing the chemical stability of two lots of ampules containing the composition of the present invention at concentrations of five milligrams of hydrocortisone per cubic centimeter of aqueous vehicle containing fifty percent ethanol.

TABLE I
*Physical stability*

| Concentration of Hydrocortisone, mg./cc. | Percent Ethanol | Period of Physical Stability | |
|---|---|---|---|
| | | 4° C. | 25° C. |
| 17.5 | 95 | 2-3 weeks | |
| 20 | 95 | 2-3 weeks | |
| 22 | 95 | <3 days | |
| 10 | 95 | >3 weeks | |
| 5 | 70 | >2 mos | |
| 5 | 50 | >2 mos | |
| 5 | 40 | <2 mos | |
| 6 | 50 | >2 mos | |
| 7 | 50 | >2 mos | |
| 8 | 50 | >2 mos | |
| 10 | 50 | 1-2 weeks | |
| 12 | 50 | <2 days | |
| 10 | 50 | <5 days | |
| 12 | 50 | <1 day | |
| 11 | 50 | <1 day | |
| 30 | 95 | | <1 day. |
| 33 | 95 | | <1 day. |
| 0.29 | None ($H_2O$) | | In solution. |
| 1.5 | 10 | | <2 days. |
| 7.5 | 50 | >12 days | |
| 1.5 | 10 | | 2 hours. |
| 2.0 | 10 | | 25 minutes. |

TABLE II
*Chemical stability*

| | Lot No. 1 | | | Lot No. 2 | | |
|---|---|---|---|---|---|---|
| | Hydrocortisone, mg./cc. | Percent Ethanol | pH | Hydrocortisone, mg./cc. | Percent Ethanol | pH |
| Theory | 5 | 52.5 | | 5.1 | 52.5 | |
| Label | 5 | 50 | | 5 | 50 | |
| Initial assay | 4.89 | 50.3 | 7.0 | 5.28 | 51.5 | 6.9 |
| 1 mo. 4° | 4.75 | | 6.1 | 5.15 | | 7.0 |
| 1 mo. 25° | 4.95 | | 6.4 | 5.15 | | 6.75 |
| 1 mo. 40° | 4.89 | | 6.4 | 5.45 | | 6.8 |
| 2 mos. 4° | 5.1 | | 6.6 | | | |
| 2 mos. 25° | 4.90 | | 6.8 | | | |
| 2 mos. 40° | 4.80 | | | | | |
| 5 mos. 4° | 4.90 | | | | | |
| 5 mos. 25° | 4.90 | | | | | |
| 5 mos. 40° | 4.90 | | | | | |
| 9 mos. 25° | | | | 5.13 | | 7.15 |
| 12 mos. 4° | 5.03 | | 6.45 | | | |
| 12 mos. 25° | 4.91 | | 5.90 | | | |
| 12 mos. 40° | 4.96 | | 5.00 | | | |

The following example is illustrative of the composition and process of the present invention but is not to be construed as limiting.

EXAMPLE 1

To prepare 1,000 twenty cubic centimeter ampules containing five milligrams of hydrocortisone per cubic centimeter of aqueous vehicle containing fifty percent by volume of ethanol, 103 grams of hydrocortisone free alcohol are dissolved in 10.3 liters of ethanol with moderate stirring. 10.3 liters of water is added with stirring and the composition is assayed for ethanol, hydrocortisone and pH. The pH initially should be about seven. The solution is aged for two days at four degrees centigrade and then sterilized by filtration. 20.6 cubic centimeters of the composition is filled into sterile twenty cubic centimeter ampules which are then sealed. The pH should fall in the range of 5.5 to 7.2.

This product can be used in at least twenty different infusion combinations including gelatin, saline, dextrose, dextran, serum albumin, blood and in combination with infusion solutions and other drugs such as injectable B-vitamin preparations, penicillin, phenylepherine hydrochloride, and the like. No incompatibilities have been noted to date.

It is to be understood that the invention is not to be limited to the exact details of operation or compositions shown and described, as obvious variations thereof can be made by those skilled in the art, and the invention is therefore to be limited only by the scope of the appended claims.

I claim:
1. A therapeutic composition suitable for intravenous use upon dilution with an infusion solution comprising up to about eight milligrams of hydrocortisone free alcohol per cubic centimeter of aqueous vehicle containing from about fifty to about seventy percent by volume of ethanol.
2. A therapeutic composition suitable for intravenous use upon dilution with an infusion solution comprising about five milligrams of hydrocortisone free alcohol per cubic centimeter of aqueous vehicle containing about fifty percent by volume of ethanol.

References Cited in the file of this patent

Thorn et al.: The New England Journal of Medicine, vol. 248, No. 10, Mar. 5, 1953, p. 420.